(12) United States Patent
Komori et al.

(10) Patent No.: US 7,641,394 B2
(45) Date of Patent: Jan. 5, 2010

(54) BEARING APPARATUS FOR A WHEEL OF VEHICLE

(75) Inventors: Kazuo Komori, Iwata (JP); Kazuhiro Baba, Iwata (JP); Kazunori Kubota, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/277,427

(22) Filed: Nov. 25, 2008

(65) Prior Publication Data

US 2009/0116779 A1 May 7, 2009

Related U.S. Application Data

(63) Continuation of application No. PCT/JP2007/000554, filed on May 23, 2007.

(30) Foreign Application Priority Data

| May 26, 2006 | (JP) | ............................. 2006-146331 |
| Jun. 15, 2006 | (JP) | ............................. 2006-165600 |
| Jun. 15, 2006 | (JP) | ............................. 2006-165601 |
| Jun. 15, 2006 | (JP) | ............................. 2006-165602 |
| Jun. 23, 2006 | (JP) | ............................. 2006-173724 |
| Jun. 23, 2006 | (JP) | ............................. 2006-173725 |

(51) Int. Cl.
*F16C 19/38* (2006.01)

(52) U.S. Cl. ...................... 384/544; 384/589

(58) Field of Classification Search ................. 384/544, 384/589, 494
See application file for complete search history.

(56) References Cited

U.S. PATENT DOCUMENTS

| 5,226,738 | A | 7/1993 | Valette et al. |
| 2003/0128904 | A1* | 7/2003 | Hacker et al. ............... 384/589 |
| 2005/0111771 | A1 | 5/2005 | Shevket |
| 2006/0269181 | A1* | 11/2006 | Hattori et al. ............... 384/544 |
| 2007/0058894 | A1* | 3/2007 | Takada et al. ............... 384/544 |

FOREIGN PATENT DOCUMENTS

| JP | 5-81523 | 11/1993 |
| JP | 2000-071705 | 3/2000 |

(Continued)

*Primary Examiner*—Thomas R Hannon
(74) *Attorney, Agent, or Firm*—Harness, Dickey & Pierce, P.L.C.

(57) ABSTRACT

A vehicle wheel bearing apparatus has an outer member and inner member. The inner member includes a wheel hub and inner ring. The outer member and inner member include respective raceway surfaces. Double row rolling elements are freely rollably contained between the outer and inner raceway surfaces, respectively, of the outer member and the inner member. At least the inner side rolling elements of the double row rolling elements are tapered rollers. A pitch circle diameter of the inner side rolling elements is set smaller than a pitch circle diameter of the outer side rolling elements. A substantially conical recess is formed at an outer side end portion of the wheel hub. The depth of the recess extends near to a shaft shaped portion beyond the bottom of the inner raceway surface of the wheel hub. The thickness of a portion of the wheel hub where the inner raceway surface is formed is set within a predetermined range. The outer side wall of the wheel hub is formed to have a substantially constant thickness along the inner surface of the recess.

16 Claims, 9 Drawing Sheets

FOREIGN PATENT DOCUMENTS

| | | |
|---|---|---|
| JP | 2000-289403 | 10/2000 |
| JP | 2002-139060 | 5/2002 |
| JP | 2002-250358 | 9/2002 |
| JP | 2004-052784 | 2/2004 |
| JP | 2004-108449 | 4/2004 |
| JP | 2004-340242 | 12/2004 |
| JP | 2005-061616 | 3/2005 |
| JP | 2006-076346 | 3/2006 |
| JP | 2006-118626 | 5/2006 |

* cited by examiner

[Fig 1]
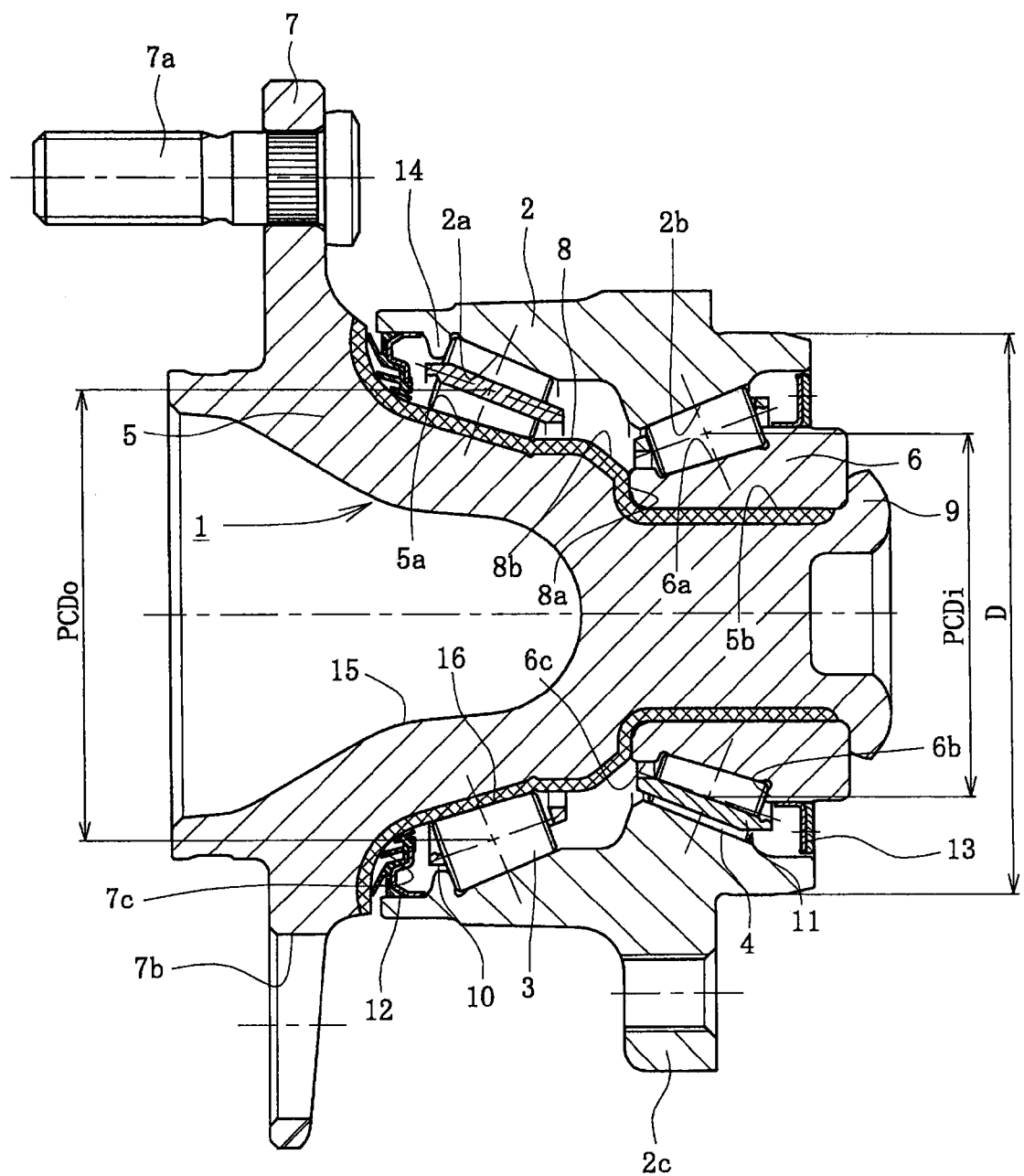

[Fig 2]
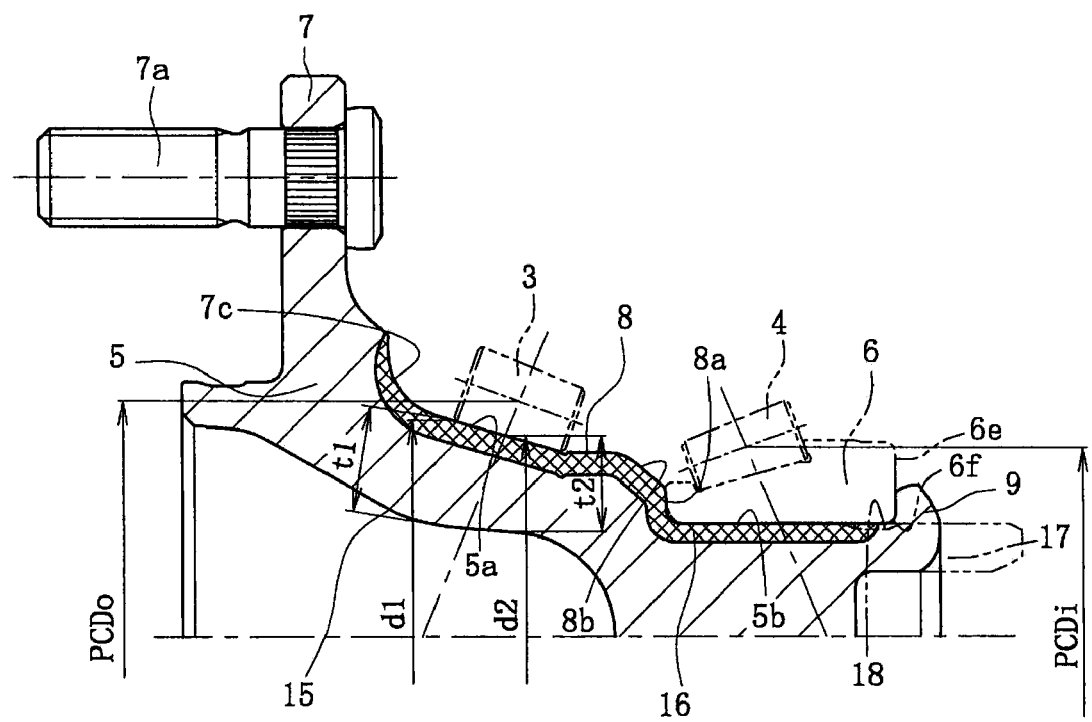

[Fig 3]
(a)
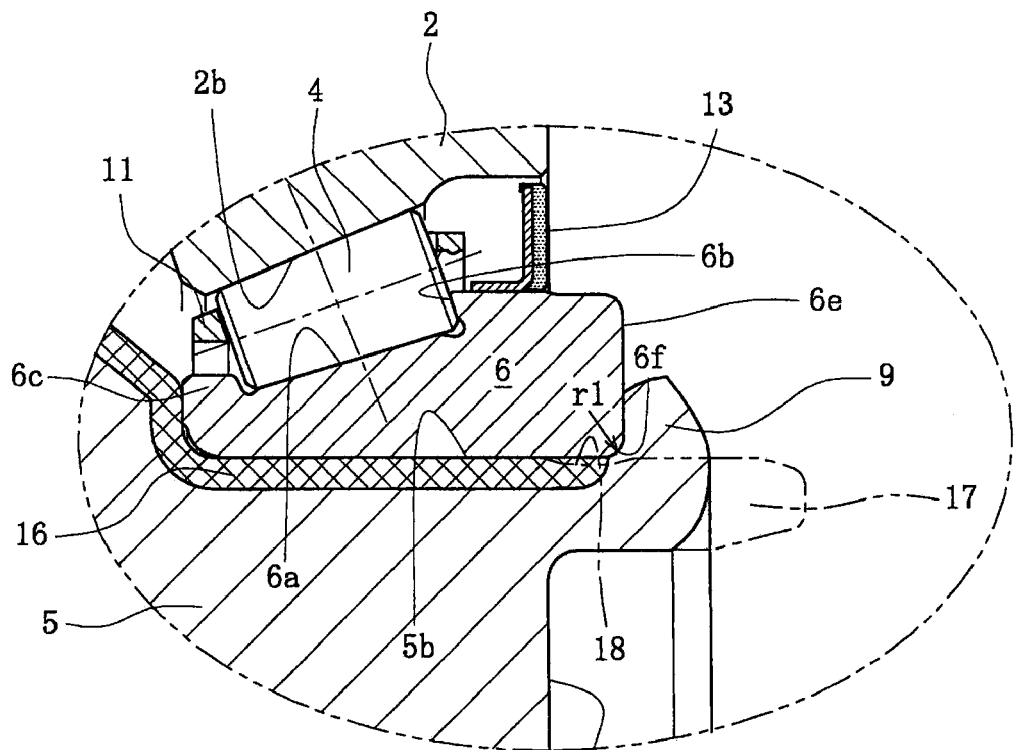
(b)
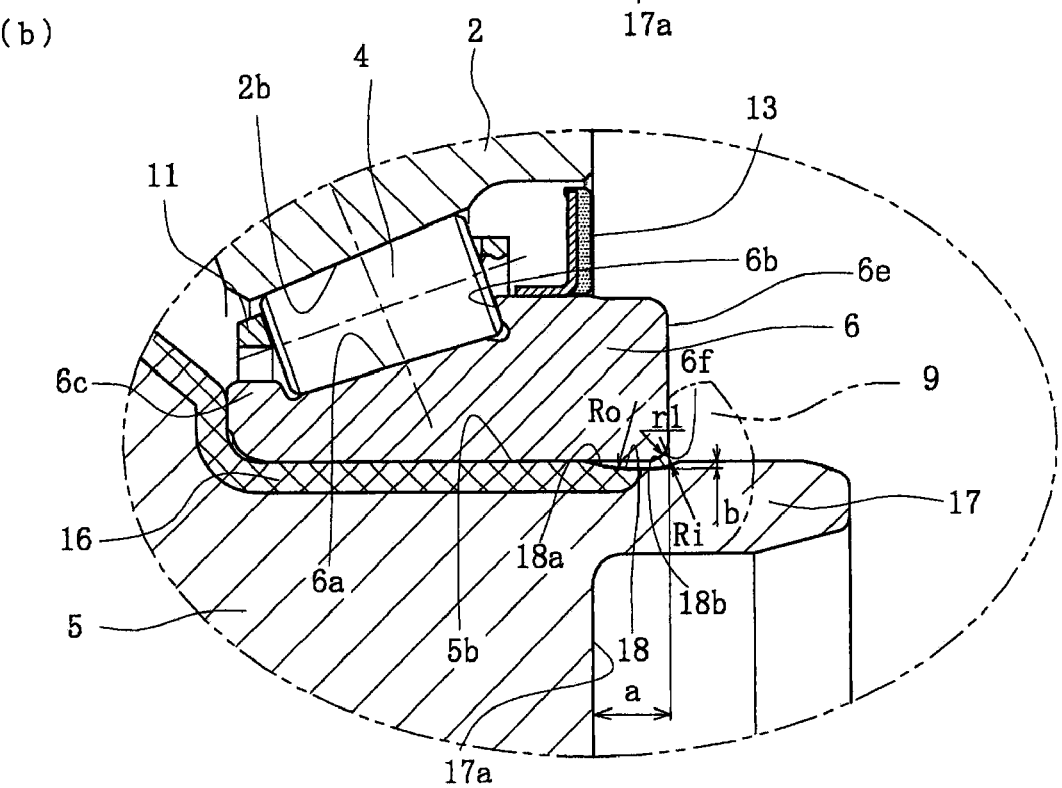

[Fig 4]
(a)
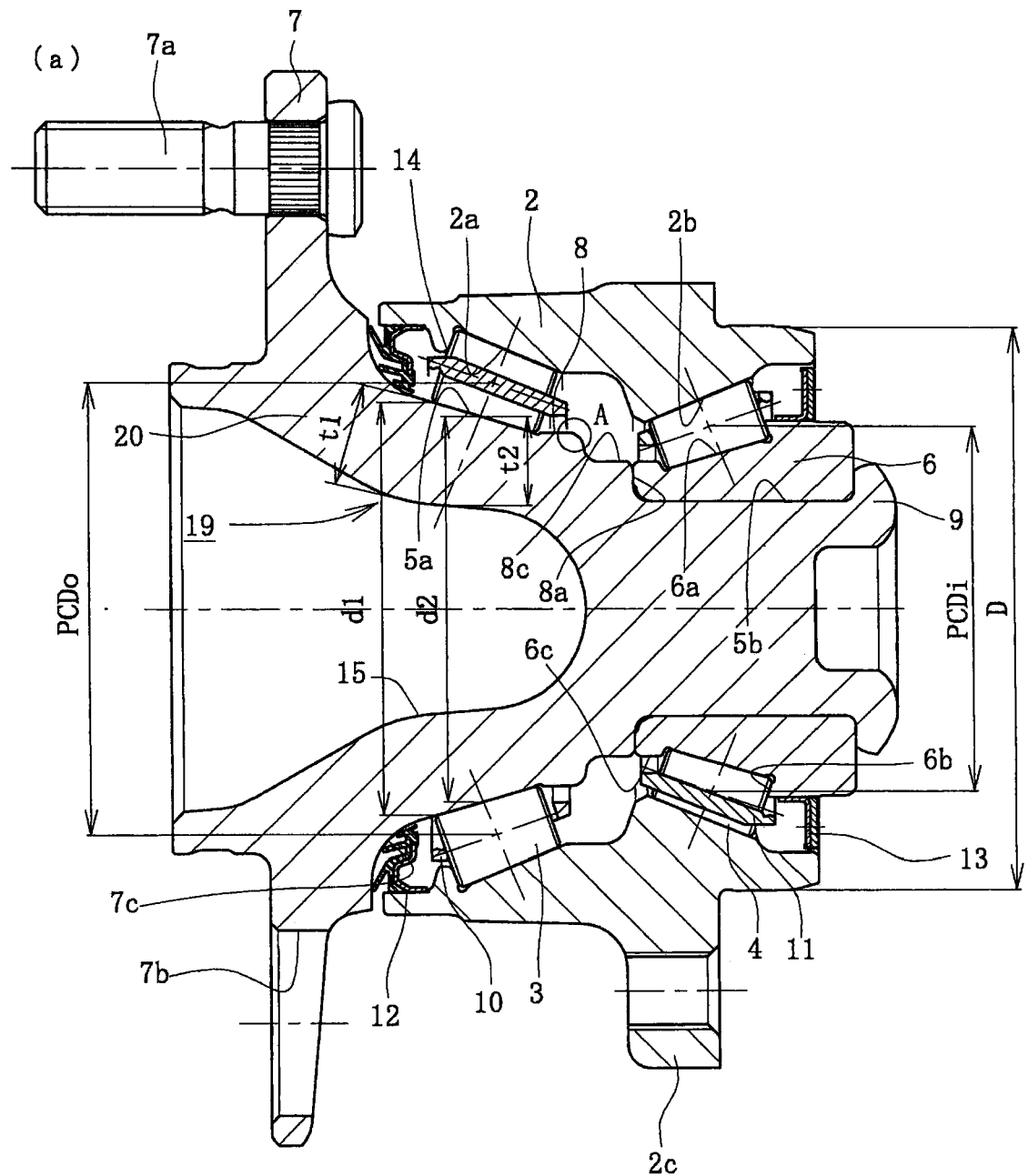
(b)
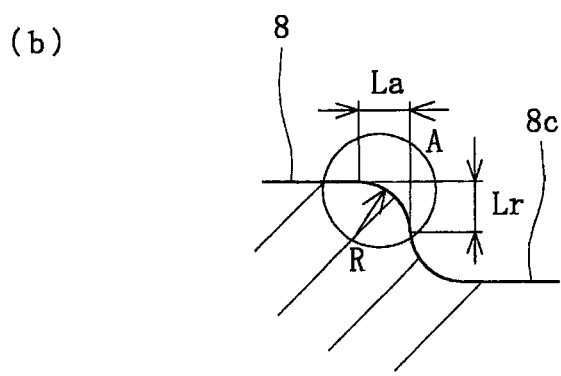

[Fig 5]
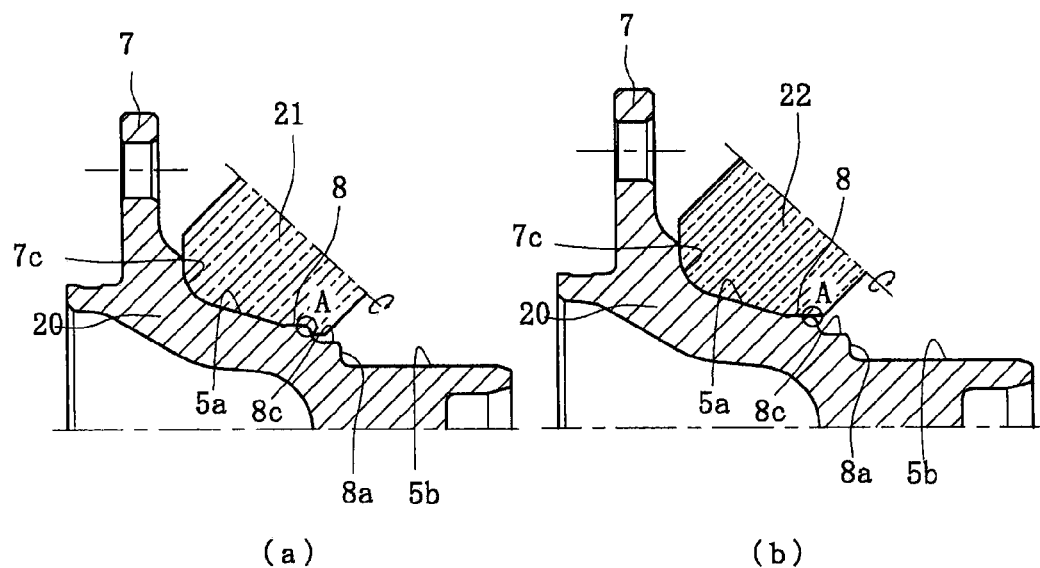
(a)　　　　　　　(b)
[Fig 6]
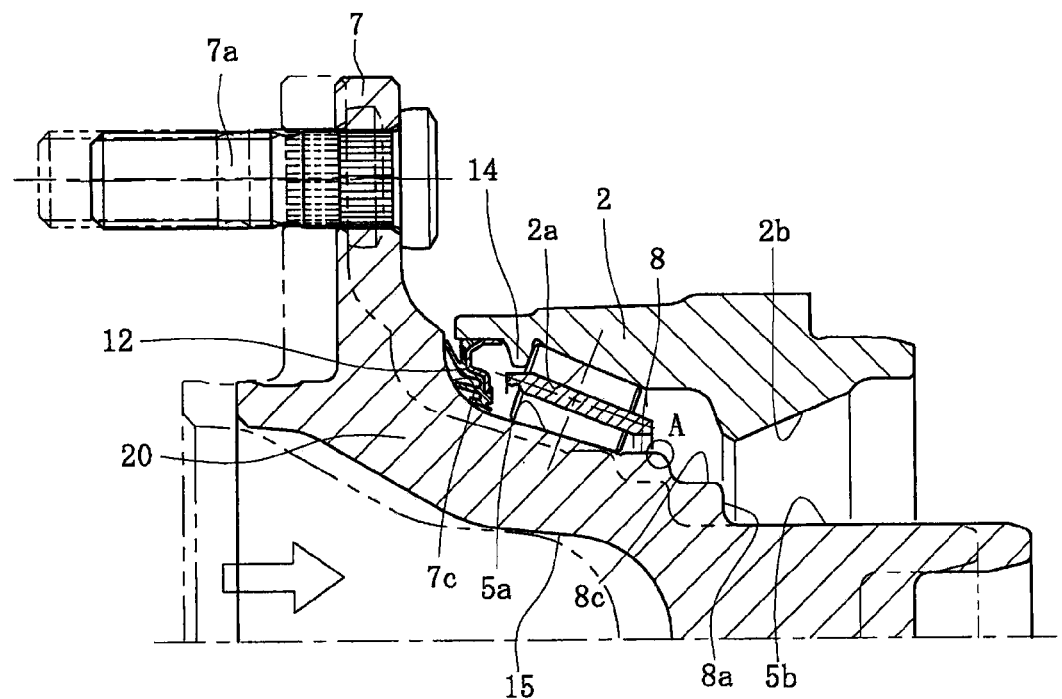

[ Fig 7 ]
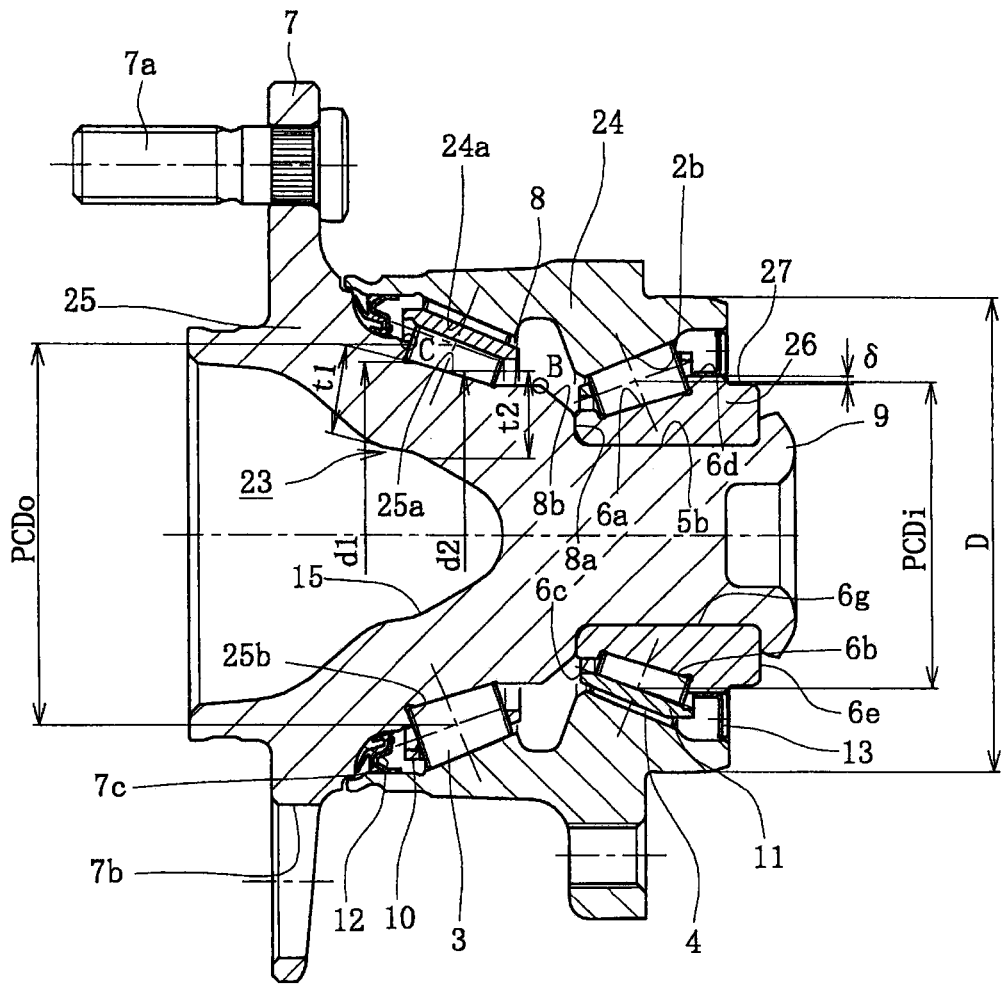
[ Fig 8 ]
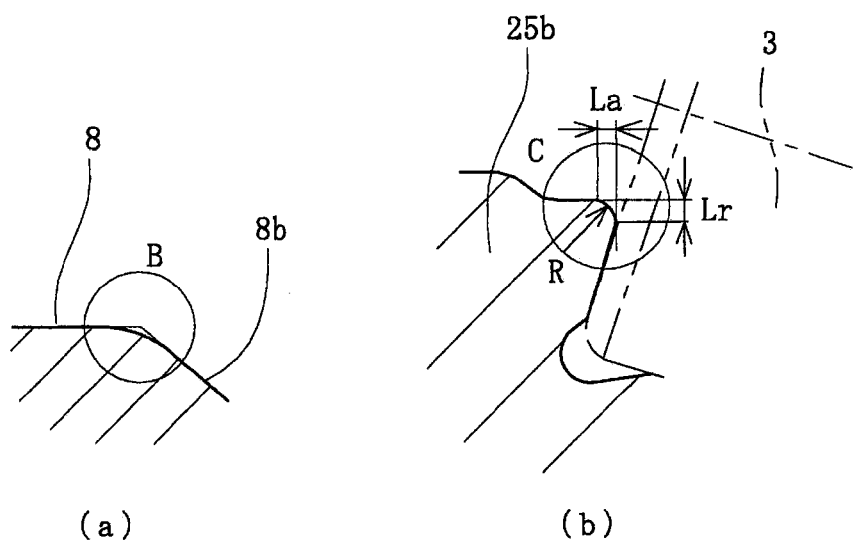
(a)    (b)

[Fig 9]
(a)
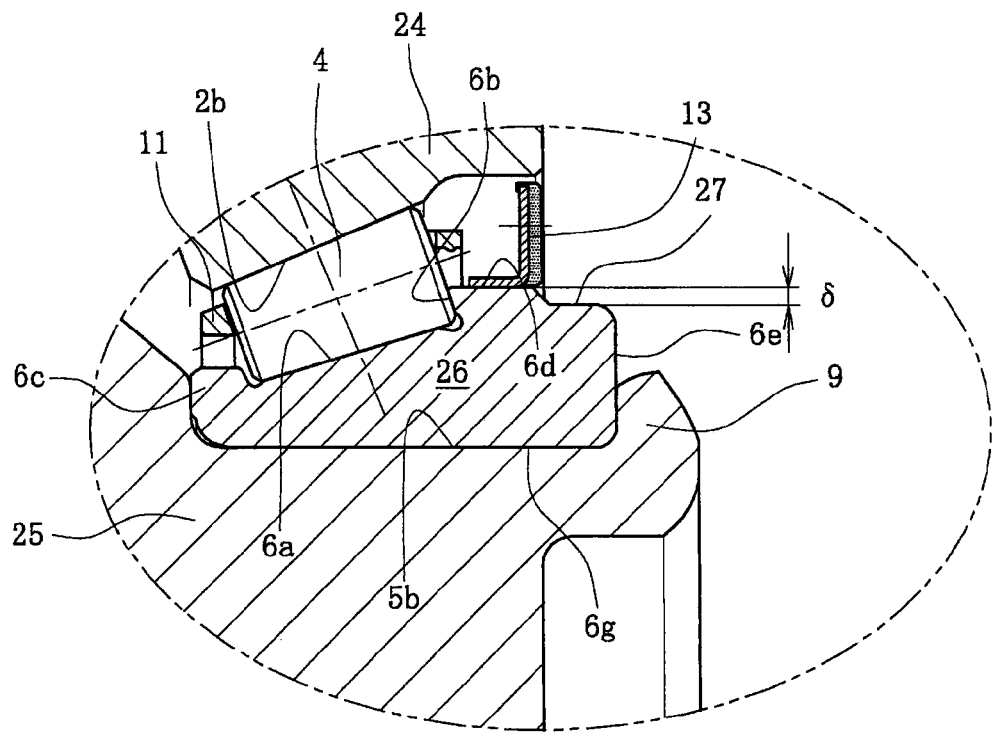
(b)
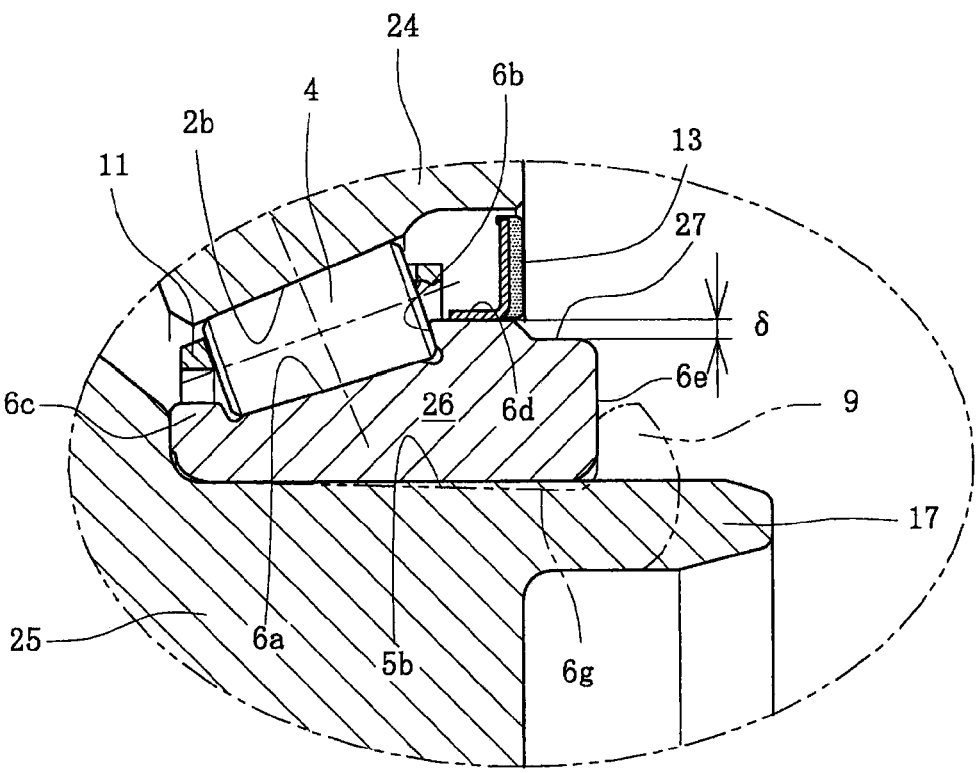

[Fig 10]
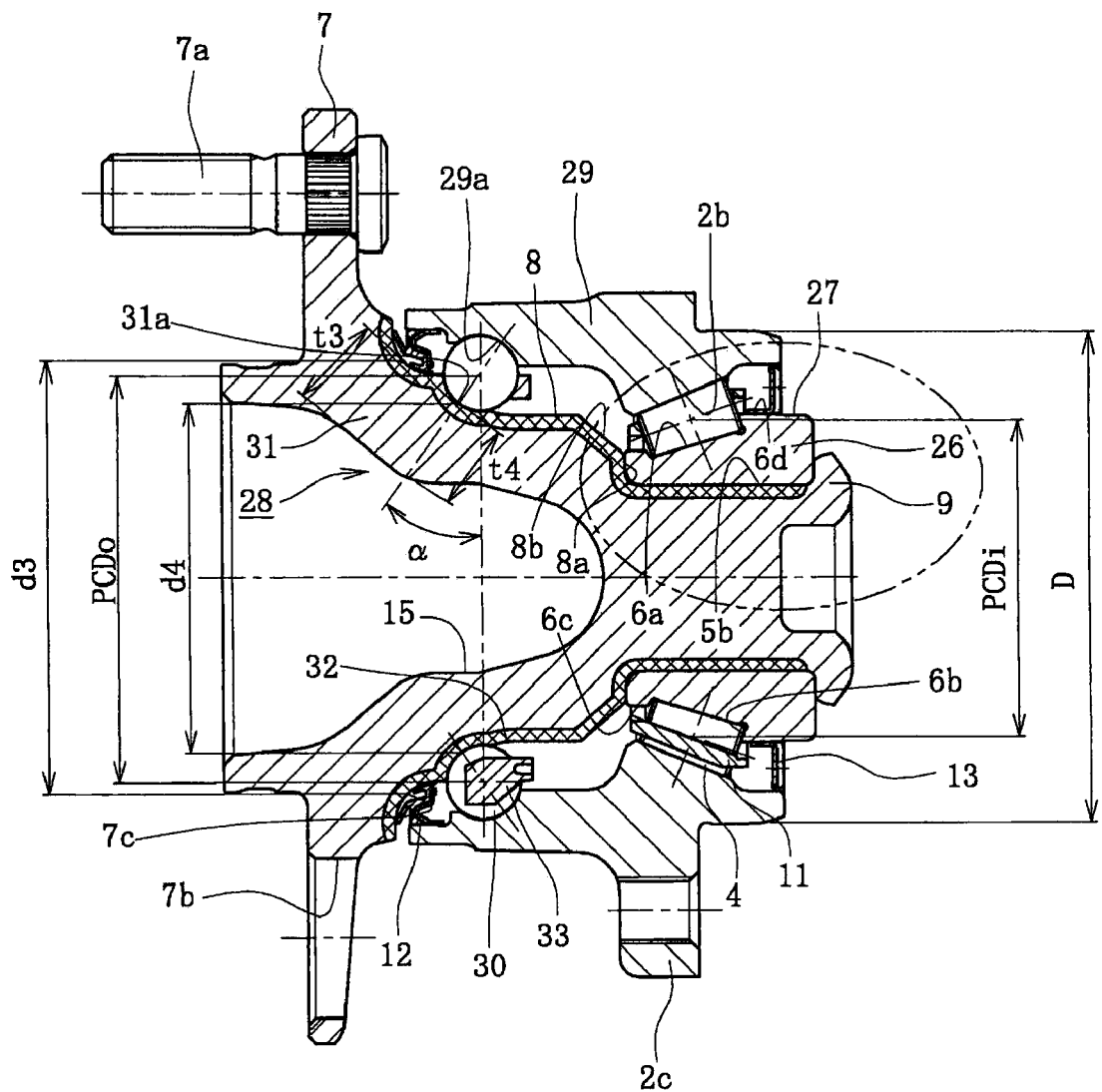

[ Fig 11 ]
PRIOR ART
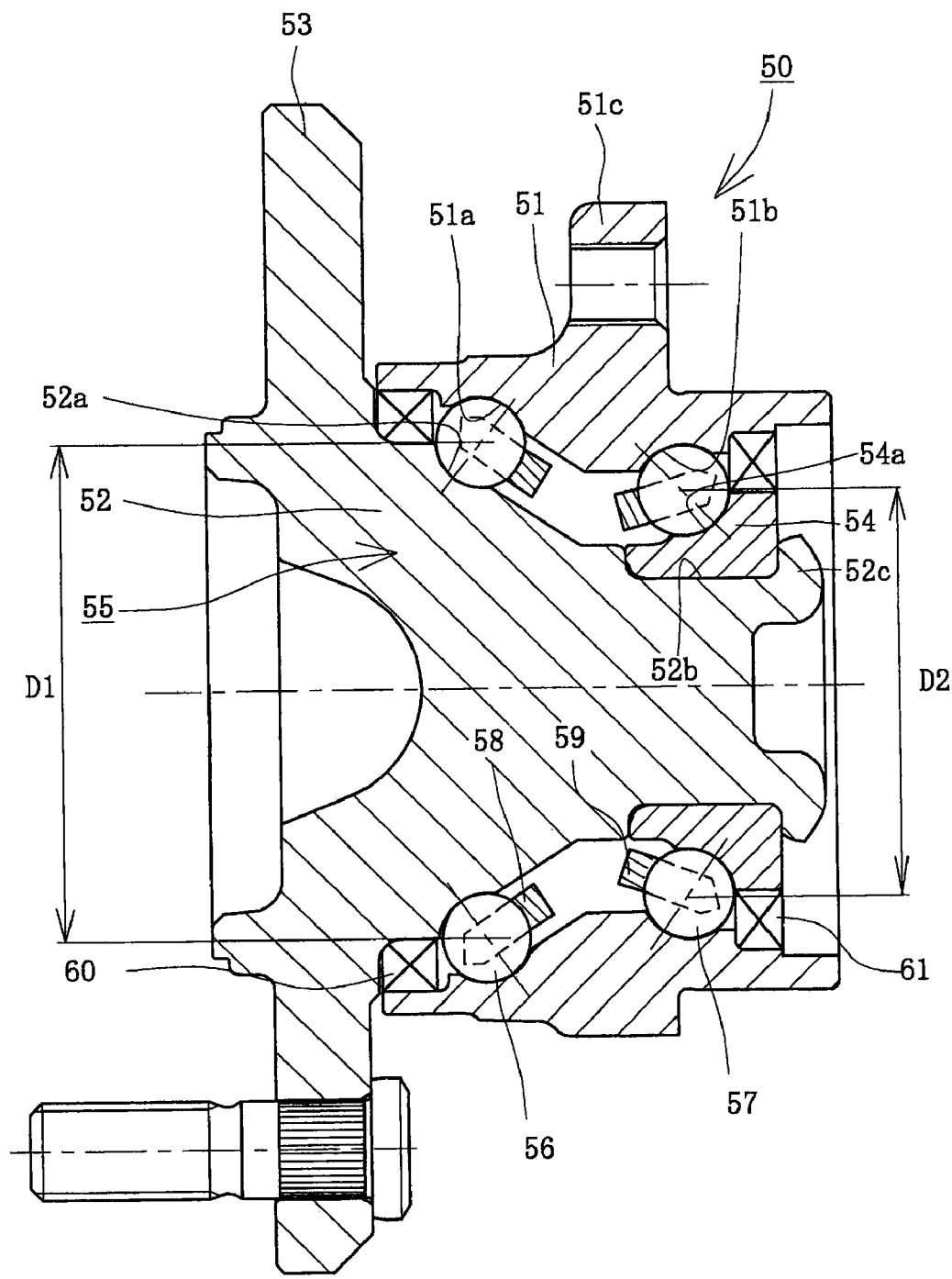

BEARING APPARATUS FOR A WHEEL OF VEHICLE

CROSS-REFERENCE TO RELATED APPLICATIONS

This application is a continuation of International Application No. PCT/JP2007/000554, filed May 23, 2007, which claims priority to Japanese Application Nos. 2006-146331, filed May 26, 2006; 2006-165600, filed Jun. 15, 2006; 2006-165601, filed Jun. 15, 2006; 2006-165602, filed Jun. 15, 2006; 2006-173724, filed Jun. 23, 2006 and 2006-173725, filed Jun. 23, 2006. The disclosures of the above applications are incorporated herein by reference.

FIELD

The present disclosure relates to a bearing apparatus that freely rotationally supports a vehicle wheel, a wheel bearing apparatus and, more particularly, to a wheel bearing apparatus that increases rigidity and thus extends the life of the wheel bearing apparatus.

BACKGROUND

Usually, a wheel bearing apparatus is used to freely rotationally support a wheel hub to mount the wheel, via a rolling bearing, for a driving wheel and a driven wheel. Generally, for structural reasons, an inner ring rotation type bearing is adopted for a driving wheel and both inner ring rotation and outer ring rotation types for a driven wheel. Double row angular ball bearings are widely used in such a bearing apparatus. The double row angular ball bearings has a desirable bearing rigidity, high durability against misalignment and small rotation torque, superior for fuel consumption. Double row tapered roller bearings are used for heavy weight vehicles such as off-road cars or trucks.

The vehicle bearing apparatus is broadly classified into a first generation structure where a wheel bearing of a double row angular contact ball bearing is fit between a knuckle, forming part of a suspension, and a wheel hub. In a second generation structure, a body mounting flange or a wheel mounting flange is formed directly on the outer circumference of an outer member. In a third generation structure, one of the inner raceway surfaces is directly formed on the outer circumference of the wheel hub. In a fourth generation structure, the inner raceway surfaces are directly formed on the outer circumference of the wheel hub and the constant velocity universal joint.

In the prior art wheel bearing apparatus, since both bearing row arrangements in double row bearing are the same, although it has a sufficient rigidity during straight way running, optimum rigidity cannot always be obtained during the curved way running. The positional relationship between the wheels and the bearing apparatus is usually designed so that the weight of the vehicle acts on substantially the middle between the rows of bearing balls during straight way running. However, during curved way running, a larger radial load and a larger axial load are applied to the axles of the vehicle of the side opposite to the curving direction (i.e., axles of the left hand side of vehicle when right hand curving). Accordingly, it is effective to have a larger rigidity of the bearing row on the outer side than that of the bearing row of the inner side in order to improve the durability and strength of the bearing apparatus. Thus, a known vehicle wheel bearing apparatus shown in FIG. 11 can have a high rigidity without enlargement of the bearing apparatus.

The vehicle wheel bearing apparatus 50 is formed with a double row angular ball bearing comprising an outer member 51 integrally formed with a body mounting flange 51*c* on its outer circumference. The body mounting flange 51*c* is to be mounted on a knuckle (not shown) of a vehicle. Its inner circumference includes double row outer raceway surfaces 51*a*, 51*b*. An inner member 55 includes a wheel hub 52 with a wheel mounting flange 53 integrally formed at one end for mounting to a wheel (not shown). One inner raceway surface 52*a* is formed on the wheel hub outer circumference opposite to one 51*a* of the double row outer raceway surfaces 51*a*, 51*b*. A cylindrical portion 52*b* axially extends from the inner raceway surface 52*a*. An inner ring 54 is fit onto the cylindrical portion 52*b*. The inner ring outer circumference includes the other inner raceway surface 54*a* opposite to the other raceway surface 51*b* of the double row outer raceway surfaces 51*a*, 51*b*. Double row balls 56, 57 are freely rollably contained between the outer raceway surfaces 51*a*, 51*b* and inner raceway surfaces 52*a*, 54*a* of the inner member 55. Cages 58, 59 rollably hold the balls 56, 57.

The inner ring 54 is axially immovably secured on the cylindrical portion 52*b* by a caulked portion 52*c*. The caulked portion 52*c* is formed by plastically deforming, radially outward, the cylindrical portion 52*b* of the wheel hub 52. Seals 60, 61 are mounted in annular openings formed between the outer member 51 and the inner member 55. The seals prevent leakage of grease contained within the bearing apparatus and the entry of rain water or dusts into the bearing apparatus from the outside.

A pitch circle diameter D1 of the outer side ball group 56 is set larger than a pitch circle diameter D2 of the inner side ball group 57. Accordingly, the diameter of the inner raceway surface 52*a* of the wheel hub 52 is larger the diameter of the inner raceway surface 54*a* of the inner ring 54. The outer raceway surface 51*a* of the outer side of the outer member 51 is larger than that of the outer raceway surface 51*b* of the inner side of the outer member 51. Also, the number of outer side balls 56 is larger than the number of the inner side balls 57. By setting the pitch circle diameter D1 of the outer side is larger than the pitch circle diameter D2 of the inner side (D1>D2), it is possible to obtain a large rigidity of the bearing apparatus 50 and thus to extend its life (see Japanese Laid-open Patent Publication No. 108449/2004).

SUMMARY

In the prior art wheel bearing apparatus 50, the pitch circle diameter D1 of the outer side ball group 56 is set larger than the pitch circle diameter D2 of the inner side ball group 57. Accordingly, the diameter of the inner raceway surface 52*a* of the wheel hub 52 is larger than that of the inner raceway surface 54*a* of the inner ring 54. This enables the bearing apparatus 50 to obtain a large rigidity and thus extend the life as described above. However, since the wheel hub 52 has an expanded diameter it is impossible to avoid an increase in weight of the wheel bearing apparatus and thus a reduction of its weight is limited.

It is, therefore, an object of the present disclosure to provide a wheel bearing apparatus that can simultaneously solve the antinomic problems of reducing the weight and size of the wheel bearing apparatus and increase its rigidity and strength.

To achieve the object of the present disclosure, a vehicle wheel bearing apparatus is provided that comprises an outer member formed with a body mounting flange on its outer circumference. The body mounting flange is to be mounted on a suspension apparatus of a vehicle. The outer member inner circumference includes double row outer raceway surfaces. An inner member includes a wheel hub and an inner ring. The wheel hub has, at one end, an integrally formed wheel mounting flange. Its outer circumference includes one inner raceway surface arranged opposite to one of the double row outer raceway surfaces. A cylindrical portion axially extends from the inner raceway surface, via a shaft shaped portion. The inner ring is adapted to fit onto the cylindrical portion of the wheel hub via a predetermined interference. The inner ring outer circumference includes the other inner raceway surface arranged opposite to the other of the double row outer raceway surfaces. Double row rolling elements are freely rollably contained between the outer and inner raceway surfaces, respectively, of the outer member and the inner member. At least the inner side rolling elements of the double row rolling elements are tapered rollers. A pitch circle diameter of the inner side rolling elements is set smaller than a pitch circle diameter of the outer side rolling elements. A substantially conical recess is formed at an outer side end portion of the wheel hub. The depth of the recess extends near to the shaft shaped portion beyond the bottom of the inner raceway surface of the wheel hub. The thickness of a portion of the wheel hub at which the inner raceway surface is formed is set within a predetermined range. The outer side wall of the wheel hub is formed with a substantially constant thickness along the inner surface of the recess.

According to the wheel bearing apparatus, at least the inner side rolling elements of the double row rolling elements are tapered rollers. The pitch circle diameter of the inner side rolling elements is set smaller than that of the outer side rolling elements. A substantially conical recess is formed at an outer side end portion of the wheel hub. The depth of the recess extends to near the shaft shaped portion beyond the bottom of the inner raceway surface of the wheel hub. The thickness of a portion of the wheel hub at which the inner raceway surface is formed is set within a predetermined range. The outer side wall of the wheel hub is formed with a substantially constant thickness along the inner surface of the recess. Thus, it is possible to provide a wheel bearing apparatus that can simultaneously solve the antinomic problems of reducing the weight and size of the wheel bearing apparatus while increasing its rigidity and strength.

A predetermined hardened layer is continuously formed, by high frequency induction quenching, in a region from the inner side base of the wheel mounting flange of the wheel hub to the cylindrical portion. The thickness of a wall of the wheel hub where the inner raceway surface is formed is set larger than two times the effective depth of the hardened layer. This makes it possible to assure the strength and rigidity of the wheel hub and to prevent the generation of cracks during high frequency induction quenching.

The outer side rolling elements are tapered rollers. The thickness t1 of a wall of the wheel hub where the larger diameter side of the inner raceway surface is positioned is set larger than the thickness t2 of a wall of the wheel hub where the middle portion of the inner raceway surface is positioned. The thickness t1 and the diameter d1 of the outer circumference of the wheel hub, at a same position as that of the thickness t1, is set to have a relationship $0.2 \leq t1/d1 \leq 0.3$. This makes it possible to assure the strength and rigidity of the wheel hub and to achieve a reduction of its weight.

It is preferable that the thickness t2 of a wall of the wheel hub where the middle portion of the inner raceway surface is positioned and the diameter d2 of the outer circumference of the wheel hub, at a same position as that of the thickness t2, is set to have a relationship $0.2 \leq t2/d2 \leq 0.3$. This makes it possible to assure the strength and rigidity of the wheel hub and to achieve further reduction of its weight.

Any larger flange to guide the tapered rollers is not formed on the larger diameter side of the inner raceway surface of the wheel hub. The larger flange is formed on the larger diameter side of the outer raceway surface of the outer member. This makes it possible to reduce stress concentration at the wheel hub loaded, via the tapered rollers. Thus, fatigue of the wheel hub is reduced, although a large moment load is applied to the wheel mounting flange. Also, it assures the strength and durability of the wheel bearing apparatus.

The diameter of each inner side rolling element is smaller than that of each outer side rolling element. This makes it possible to reduce the size of a knuckle and the weight and size of the wheel bearing apparatus. Also, it increases the fundamental rated load of each row of rolling elements.

The outer side rolling elements are balls. The wall thickness of the inner raceway surface of the wheel hub is set to have a range of 0.2~0.3 times the outer circumference of the wheel hub at its same position. This makes it possible to assure the strength and rigidity of the wheel hub and to achieve a reduction of its weight.

The corner portion of the circumference of the wheel hub has a surface of a predetermined circular arc cross-section. Its transition portions are smoothly formed. This makes it possible to prevent the generation of damage of the rolling elements during assembly of the wheel bearing apparatus. Thus, this extends its life.

The corner portion is ground by a formed grinding wheel simultaneously with the inner raceway surface after heat treatment. This makes it possible to further smoothly form the connection portion.

The inner ring is axially secured on the wheel hub while being applied with a predetermined bearing pre-load by a caulked portion. The caulked portion is formed by plastically deforming, radially outward, the end of the cylindrical portion of the wheel hub. This makes it possible to further reduce the weight and size of the wheel bearing apparatus and to maintain an initially set pre-load for a long term.

A predetermined hardened layer is continuously formed, by high frequency induction quenching, in a region from the inner side base of the wheel mounting flange to a portion, near the caulking portion of the cylindrical portion, via the inner raceway surface and the shaft shaped portion. This makes it possible to achieve both a reduction of the weight and size of the wheel bearing apparatus and to increase its rigidity.

The inner side end position of the hardened layer is set within a region from a position corresponding to the larger diameter end of the inner raceway surface of the inner ring to a position near the caulking portion. This makes it possible to suppress the deformation of the inner ring and thus its larger flange by the caulking process. Also, it assures a predetermined force to secure the inner ring.

The end portion of the cylindrical portion before caulking is formed as a hollow cylindrical portion. The circumference of the hollow cylindrical portion is formed with an annular groove having a depth of 0.5~1.0 mm. The annular groove is positioned on an inner side at a position corresponding to the larger diameter end of the inner raceway surface. It extends so that it extends from a chamfered portion of the inner ring beyond its larger diameter end face. The hardened layer extends to the annular groove. This makes it possible to assure a force to secure the inner ring while suppressing its deformation by the caulking process. This improves workability of the hollow cylindrical portion to prevent the generation of cracks due to its plastic deformation. Thus, it suppresses deformation of the wheel hub.

The larger diameter end of the inner raceway surface of the inner ring is formed at a position away from, more than 5 mm, the larger end face of the inner ring. This makes it possible to prevent the deformation of the larger flange of the inner ring by the caulking process. Thus, this assures a good contacting condition between the inner ring and the tapered rollers.

The inner ring is formed on its outer circumference with a tapered inner raceway surface. A larger flange is on the larger diameter side of the inner raceway surface. The larger flange guides the tapered rollers. The inner ring is formed, on its inner side, with a smaller diameter portion, via a predetermined step. This makes it possible to reduce hoop stress generated on the outer diameter surface of the inner ring and to suppress the deformation (falling down) of the larger flange of the inner ring even though the inner ring is expanded radially outward during the caulking process.

The interference between the inner ring and the cylindrical portion gradually increases toward the inner side. This makes it possible to increase the inner ring fastening force near the caulking portion. Thus, this suppresses the deformation of the cylindrical portion.

The wheel bearing apparatus comprises an outer member formed with a body mount flange on its outer circumference. The body mounting flange is to be mounted on a suspension apparatus of a vehicle. Its inner circumference has double row outer raceway surfaces. An inner member includes a wheel hub and an inner ring. The wheel hub has, at one end, an integrally formed wheel mounting flange. The wheel hub outer circumference has one inner raceway surface arranged opposite to one of the double row outer raceway surfaces. A cylindrical portion axially extends from the inner raceway surface, via a shaft shaped portion. The inner ring is adapted to fit onto the cylindrical portion of the wheel hub, via a predetermined interference. The inner ring outer circumference has the other inner raceway surface arranged opposite to the other of the double row outer raceway surfaces. Double row rolling elements are freely rollably contained between the outer and inner raceway surfaces, respectively, of the outer member and the inner member. At least the inner side rolling elements of the double row rolling elements are tapered rollers. A pitch circle diameter of the inner side rolling elements is set smaller than the pitch circle diameter of the outer side rolling elements. A substantially conical recess is formed at an outer side end portion of the wheel hub. The depth of the recess extends near to the shaft shaped portion beyond the bottom of the inner raceway surface of the wheel hub. The thickness of a portion of the wheel hub, where the inner raceway surface is formed, is set within a predetermined range. The outer side wall of the wheel hub is formed as having a substantially constant thickness along the inner surface of the recess. Thus, it is possible to provide a wheel bearing apparatus which can simultaneously solve the antinomic problems of reducing the weight and size of the wheel bearing apparatus while increasing its rigidity and strength.

A vehicle wheel bearing apparatus comprises an outer member formed with a body mounting flange on its outer circumference. The body mounting flange is to be mounted on a suspension apparatus of a vehicle. Its inner circumference has double row outer raceway surfaces. An inner member includes a wheel hub and an inner ring. The wheel hub has, at one end, an integrally formed wheel mounting flange. The wheel hub outer circumference has one inner raceway surface arranged opposite to one of the double row outer raceway surfaces. A cylindrical portion axially extends from the inner raceway surface, via a shaft shaped portion. The inner ring is adapted to fit onto the cylindrical portion of the wheel hub, via a predetermined interference. The inner ring outer circumference has the other inner raceway surface arranged opposite to the other of the double row outer raceway surfaces. Double row rolling elements are freely rollably contained between the outer and inner raceway surfaces, respectively, of the outer member and the inner member. The inner ring is axially secured onto the wheel hub, with an applied predetermined bearing pre-load, by a caulked portion. The caulking portion is formed by plastically deforming radially outward the end of the cylindrical portion of the wheel hub. A pitch circle diameter of the inner side tapered rollers of the double row tapered rollers is set smaller than a pitch circle diameter of the outer side tapered rollers. A substantially conical recess is formed at an outer side end portion of the wheel hub. The depth of the recess extends near to the shaft shaped portion beyond the bottom of the inner raceway surface of the wheel hub. The thickness $t_1$ of a wall of the wheel hub where the larger diameter side of the inner raceway surface is positioned is set larger than the thickness $t_2$ of a wall of the wheel hub where the middle portion of the inner raceway surface is positioned. The thickness $t_1$ and the diameter $d_1$ of the outer circumference of the wheel hub at the same position as that of the thickness $t_1$ is set to have a relationship of $0.2 \leq t_1/d_1 \leq 0.3$.

Further areas of applicability will become apparent from the description provided herein. The description and specific examples in this summary are intended for purposes of illustration only and are not intended to limit the scope of the present disclosure.

DRAWINGS

Additional advantages and features of the present disclosure will become apparent from the subsequent description and the appended claims, taken in conjunction with the accompanying drawings, wherein:

FIG. 1 is a longitudinal section view of a first embodiment of the vehicle wheel bearing apparatus.

FIG. 2 is a longitudinal section view of only the wheel hub of FIG. 1.

FIG. 3(a) is a partially enlarged view of FIG. 1.

FIG. 3(b) is a partially enlarged view similar to FIG. 3(a) showing a condition before a caulking process.

FIG. 4(a) is a longitudinal section view of a second embodiment of the vehicle wheel bearing apparatus.

FIG. 4(b) is a partially enlarged view of FIG. 4 (a).

FIG. 5(a) is an explanatory view of a method for simultaneously grinding corner portions of the wheel hub.

FIG. 5(b) is a method of FIG. 5(a) where the corners have been previously cut.

FIG. 6 is a cross-sectional explanatory view of an assembled condition of the outer member onto the wheel hub of FIG. 4.

FIG. 7 is a longitudinal section view of a third embodiment of the vehicle wheel bearing apparatus.

FIG. 8(a) is a partially enlarged cross-sectional view of a corner B of FIG. 7.

FIG. 8(b) is a partially enlarged sectional view of a corner C of FIG. 7.

FIG. 9(a) is a partially enlarged cross-sectional view of FIG. 7.

FIG. 9 (b) is a partially enlarged cross-sectional view similar to FIG. 9(a) of a condition before a caulking process.

FIG. 10 is a longitudinal section view of a fourth embodiment of the vehicle wheel bearing apparatus.

FIG. 11 is a prior art longitudinal section view of a vehicle wheel bearing apparatus.

DETAILED DESCRIPTION

The present disclosure will be described with reference to the drawings. FIG. 1 is a longitudinal section view of a first embodiment of the wheel bearing apparatus of vehicle of the present disclosure. FIG. 2 is a longitudinal section view of only the wheel hub of FIG. 1. FIG. 3(a) is a partially enlarged section view of FIG. 1. FIG. 3(b) is a partially enlarged section view similar to FIG. 3(a) of a condition before a caulking process. In the description below, the term "outer side" (left hand side in the drawings) of the apparatus denotes a side that is positioned outside of the vehicle body. The term "inner side" (right hand side in the drawings) of the apparatus denotes a side that is positioned inside of the body when the bearing apparatus is mounted on the vehicle body.

The wheel bearing apparatus shown in FIG. 1 is a third generation type used for a driven wheel. It has an inner member 1, an outer member 2, and double rows of tapered rollers 3, 4 freely rollably contained between the inner and outer members 1, 2. The inner member 1 includes a wheel hub 5 and an inner ring 6 press fit onto the wheel hub 5 with a predetermined interference.

The wheel hub 5 is integrally formed with a wheel mounting flange 7 at one end. One (outer side) tapered inner raceway surface 5a is on the wheel hub outer circumference. A cylindrical portion 5b extends from the inner raceway surface 5a defining an axially extending shaft shaped portion 8. It should be noted that any conventional larger flange to guide the tapered rollers 3 is not formed on the larger diameter side of the inner raceway surface 5a of the wheel hub 5. Instead, a larger flange 14 is formed on the outer member 2 as hereinafter described. In addition, any smaller flange to hold the tapered rollers 3 is not formed on the smaller diameter side of the inner raceway surface 5a. The shaft shaped portion 8 axially extends in a straight fashion from the smaller diameter side of the inner raceway surface 5a. This makes it possible to simultaneously grind an inner side base 7c of the wheel mounting flange 7. This forms a seal land portion for an outer side seal 12 (described below), and the inner raceway surface 5a by using a formed grinding wheel to smoothly connect them together. Thus, it is possible to improve the workability of the wheel hub 5 and accordingly to further suppress the increase of weight of the wheel bearing apparatus.

Hub bolts 7a are arranged on the wheel mounting flange 7 equidistantly along the periphery of the wheel mounting flange 7 and round apertures 7b are formed between the hub bolts 7a. These round apertures 7b contribute not only to reduction of the weight of the bearing apparatus but to passage of any fastening tool used for assembly and disassembly of the bearing apparatus.

The inner ring 6 is formed, on its outer circumference, with another (inner side) inner raceway surface 6a having a tapered cross section. A larger flange 6b, for guiding the tapered rollers 4, is formed on a larger diameter side of the inner raceway surface 6a. A smaller flange 6c is formed on a smaller diameter side of the inner raceway surface 6a. The smaller flange 6c prevents falling out of the tapered rollers 4 from the inner raceway surface 6a. The inner ring 6 is press fit on the cylindrical portion 5b of the wheel hub 5 via a predetermined interference. It is axially secured on the cylindrical portion 5b by a caulked portion 9. The caulked portion 9 is formed by plastically deforming the end of the cylindrical portion 5b to apply a predetermined pre-load. Accordingly, it is possible to reduce the weight and size of the bearing apparatus and to form a self-retaining structure to keep an initially set pre-load for a long term.

The wheel hub 5 is made of medium carbon steel including carbon of 0.40~0.80% by weight such as S53C. It is hardened by high frequency induction quenching to that a region, from an inner side base portion 7c (to which an outer side seal 12 contacts) of the wheel mounting flange 7 to the cylindrical portion 5b via the inner raceway surface 5a and the shaft shaped portion 8, with a hardened layer 16 with a surface hardness of 58~64 HRC (shown by cross-hatch). The caulking portion 9 remains as is with its surface hardness after forging. Accordingly, the wheel hub 1 has a sufficient mechanical strength against rotary bending loads applied to the wheel mounting flange 7. Also, the anti-fretting strength of the cylindrical portion 5b can be improved at a region press-fit by the inner ring 6. The plastically deforming working of the caulking portion 9 can be also carried out without any micro crack. The inner ring 6 and the tapered rollers 3, 4 are made of high carbon chrome steel such as SUJ2. They are hardened to their core by dipping quenching to have a surface hardness of 58~64 HRC.

The outer member 2 is integrally formed with a body mounting flange 2c on its outer circumference. The body mounting flange 2c is to be mounted on a knuckle. The outer member inner circumference has an outer side tapered outer raceway surface 2a opposite to the inner raceway surface 5a of the wheel hub 5. An inner side tapered outer raceway surface 2b is opposite to the inner raceway surface 6a of the inner ring 6. In this embodiment, the outer member 2 is formed with a larger flange 14 to guide the outer side tapered rollers 3. That is, the outer diameter side of the outer side outer raceway surface 2a of the outer member 2 is integrally formed with the larger flange 14 to guide the tapered rollers 3. This makes it possible to reduce stress concentration to the wheel hub loaded via the tapered rollers. Thus, fatigue is reduced in the wheel hub even though a large moment load is applied to the wheel mounting flange. This assures the strength and durability of the wheel bearing apparatus.

The outer member 2 is made of medium carbon steel including carbon of 0.40~0.80% by weight such as S53C. The double row outer raceway surfaces 2a, 2b are hardened by high frequency induction quenching to have a surface hardness of 58~64 HRC. A plurality of tapered rollers 3, 4 are freely rollably contained, via cages 10, 11, between the raceway surfaces 2a, 5a; 2b, 6a. Seal 12 and a cover (not shown) are mounted within annular openings formed between the outer member 2 and inner member 1. The seals 12 prevent leakage of grease contained in the bearing and the entry of rain water and dusts into the bearing from the outside. An inner side opening of the wheel bearing apparatus is communicated with the outer circumstances when the bearing apparatus is fastened to a knuckle forming a suspension apparatus of a vehicle, via the body mounting flange 2c. A seal with a magnetic encoder may be mounted within the opening, to close it, to prevent the entry of rain water and dusts into the bearing from the outside.

In this embodiment, a pitch circle diameter PCDi of the inner side tapered rollers 4 is set smaller than a pitch circle diameter PCDo of the outer side tapered rollers 3. This enables the inner side outer diameter D of the outer member 2 to be small. In addition, use of double row tapered rollers 3, 4 as the rolling elements enables an increase of the fundamental rated load of each row of rolling elements. This, in turn, extends the life of the wheel bearing apparatus.

In this embodiment, a chamfered portion 8b is formed in a stepped portion between the shaft shaped portion 8 of the wheel hub 5 and a shoulder portion 8a that abuts the inner ring 6. A substantial conical recess 15 is formed by forging on the outer side end of the wheel hub 5. The depth of the recess 15 extends to a position near the chamfered portion 8b beyond the bottom of the inner raceway surface 5a and the shaft shaped portion 8. That is, since the wheel hub 5 is deformed around the outer side inner raceway surface 5a when any moment load is applied to the wheel mounting flange 7, the applicant noticed the thickness of the wheel hub 5 at an outer side region is greater than the thickness at the inner raceway surface 5a.

As shown in FIG. 2, the inner side base portion 7c of the wheel mounting flange 7 is formed with a circular arc cross-section with a predetermined radius of curvature. The thickness t1 at the larger diameter side of the inner raceway surface 5a smoothly continues from the base portion 7c. It is formed with a thickness larger than the thickness t2 at the center of the inner raceway surface 5a. As a result of an FEM analysis of the rigidity of the wheel hub 5 from diameters d1, d2 at their respective positions, the thickness t1, t2 are set so that they satisfy the ranges $0.2 \leq t1/d1 \leq 0.3$ and $0.2 \leq t2/d2 \leq 0.3$, respectively. Also, they have a thickness more than 2 times the effective depth of hardened layer in the hardened layer 16. When the thickness t1 of the larger diameter side and the thickness t2 of the central portion of the inner raceway surface 5a are less than 20% of the diameters d1, d2, at their respective positions, deformation at their positions become large and thus desired rigidity cannot be obtained. On the other hand, when they are formed with a thickness exceeding 30%, their rigidity cannot be remarkably increased. Only the weight of the bearing apparatus is increased. When the thickness d1, d2 satisfy the range defined above, it is possible to prevent the generation of cracks by high frequency quenching and to achieve weight reduction of the wheel bearing apparatus while keeping the strength and rigidity of the wheel hub 5 corresponding to conditions of use. The effective depth of the hardened layer is set to have a range 2~5 mm (about 3.5 mm).

Also in this embodiment, a chamfered portion 6f is formed on a corner portion of an inner diameter end of the larger end face 6e of the inner ring 6, as shown in an enlarged view of FIG. 3(a). The radius of curvature r1 of the chamfered portion 6f is set within a range of 1.0~2.5 mm. When the radius of curvature r1 is set less than 1.0 mm, it is believed that stress concentration would be caused on a root portion of the caulked portion 9. Thus, this would cause damage, such as micro cracks. When the radius of curvature r1 setting exceeds 2.5 mm, the inner ring 6 would be expanded radially outward when the projected cylindrical portion 17 (shown by two dotted lines in FIG. 3 (a)) is plastically deformed during the caulking process. Thus, excessive hoop stress would be caused on the outer circumference of the inner ring 6.

Prior to caulking, shown in FIG. 3 (a), the bottom surface 17a of the cylindrical portion 17 is formed with a predetermined depth "a" from the larger end face 6e of the inner ring 6. In addition, an annular groove (undercut groove) 18 with a depth "b" is formed around the outer circumference of the cylindrical portion 17. The annular groove 18 is provided with circular arc surfaces 18a, 18b having radii of curvature Ro, Ri, respectively, at its opposite ends.

According to the caulking tests carried out by the applicant, it has been found that the larger the depth "a" the smaller the hoop stress caused on the outer circumference of the inner ring 6. The range of the depth "a" is from 0~5 mm of the bottom surface 17a of the cylindrical portion 17. It has also been found that the effect is small when "a"<5 mm and remarkable reduction of stress cannot be observed. On the other hand, if the depth "a" exceed 5 mm, not only can a predetermined inner ring fastening force not be obtained, due to lacks of inner ring pressing force, but reduction of strength and rigidity of the wheel hub 5 is caused.

The depth "b" of the annular groove 18 is set within a range of 0.5~1.0 mm. The radius of curvature Ri of the inner side circular arc surface 18b of the annular groove 18 is set within a range of 1~10 mm. The radius of curvature Ri is set larger than the radius of curvature r1 of the chamfered portion 6f of the inner ring 6 and smaller than the radius of curvature Ro of the outer side circular arc surface 18a ($r1 \leq Ri \leq Ro$. However, when the depth "b" of the annular groove 18 is less than 0.5 mm, its effect becomes insufficient. On the other hand, when it exceeds 1.0 mm, the strength of the caulked portion 9 would be reduced. The provision of such an annular groove 18 on the outer circumference of the projected cylindrical portion 17 enables easy deformation of the projected cylindrical portion 17 during the caulking process. This makes it possible to suppress the deformation of the inner ring 6. Accordingly, deformation (falling down) of the larger flange 6b of the inner ring 6 by the caulking process can be prevented. This can also prevent detraction of a contact condition between the larger flange 6b and the tapered rollers 4 and thus assure a desired life of the wheel bearing apparatus.

The larger diameter end (height of the larger flange 6b) of the inner raceway surface 6a of the inner ring 6 is formed more than 5 mm axially away from the larger end face 6e. The annular groove 18 is positioned on an inner side of the position corresponding to the larger diameter end of the inner raceway surface 6a. The annular groove 18 is formed so that it extends from the larger end face 6e of the inner ring 6 slightly beyond the chamfered portion 6f. The larger the width of the annular groove 18, the smaller the hoop stress. However, if the annular groove 18 has too large a width, not only does it reduce a pressing amount of the inner ring 6 and thus the inner ring fastening force but it reduces the strength and rigidity of the wheel hub 5. In addition, the hardened layer 16 formed around the wheel hub 5 extends to a region including the annular groove 18. Thus, it is possible to improve the workability of the projected cylindrical portion 17 of the cylindrical portion 5b. Thus, this prevents the generation of cracks by plastic deformation and suppresses deformation of the wheel hub 5 by the caulking process.

In a wheel bearing apparatus having such a structure, the pitch circle diameter PCDo of the outer side tapered rollers 3 is larger than the pitch circle diameter PCDi of the inner side tapered rollers 4. Thus, the number of the outer side tapered rollers 3 is larger than the number of the inner side tapered rollers 4. The bearing rigidity of the outer side portion is increased. The recess 15 is formed in the outer side end portion of the wheel hub 5. According to this embodiment, since the wall of the outer side end of the wheel hub 5 is formed with a substantially constant thickness corresponding to the recess 15, the wall thickness t1, t2 in portions of the inner raceway surface 5a are set within a predetermined range. The hardened layer 16 formed around the circumference of the wheel hub 5, by high frequency quenching, is formed within a predetermined region. Thus, it is possible to provide a wheel bearing apparatus that can simultaneously solve the antinomic problems of reducing the weight and size of the wheel bearing apparatus and increasing its rigidity and strength.

FIG. 4(a) is a longitudinal section view of a second embodiment of the vehicle wheel bearing apparatus. FIG. 4(b) is a partially enlarged view of FIG. 4(a). FIG. 5(a) is a cross-sectional explanatory view of a method for simultaneously grinding corner portions of the wheel hub. FIG. 5(b) shows a method of FIG. 5 (a) where the corners have been previously cut. FIG. 6 is a cross-sectional explanatory view of an assembled condition of the outer member onto the wheel hub of FIG. 4. This embodiment is fundamentally different from the first embodiment only partially in structures of the wheel hub. Thus, the same reference numerals as those used in the first embodiment are also used in this embodiment for designating same components.

The wheel bearing apparatus of this embodiment is a third generation type used for a driven wheel. It includes an inner member 19, outer member 2, and double row tapered rollers 3, 4 freely rollably contained between the inner and outer members 19, 2. The inner member 19 includes a wheel hub 20 and the inner ring 6 press fit onto the wheel hub 20, via a predetermined interference.

The wheel hub 20 is integrally formed with a wheel mounting flange 7 at one end. One (outer side) tapered inner raceway surface 5a is formed on the outer circumference. A cylindrical portion 5b extends from the inner raceway surface 5a defining an axially extending shaft shaped portion 8. A stepped portion 8c is formed between the shaft shaped portion 8 and a shoulder portion 8a that abuts against the inner ring 6. A substantial conical recess 15 is formed, by forging, on the outer side end of the wheel hub 20. The depth of the recess 15 extends to a position near the stepped portion 8c beyond the shaft shaped portion 8 so that the outer side wall thickness of the wheel hub 20 is substantially uniform.

The wheel hub 20 is made of medium carbon steel including carbon of 0.40~0.80% by weight such as S53C. It is hardened by high frequency induction quenching. A region from an inner side base portion 7c (to which an outer side seal 12 contacts) of the wheel mounting flange 7 to the cylindrical portion 5b via the inner raceway surface 5a and the shaft shaped portion 8 has a hardened layer 16 with a surface hardness of 58~64 HRC.

In this embodiment, a corner portion A between the shaft shaped portion 8 and the stepped portion 8c is formed as a smooth chamfered portion with a circular arc cross-section, as shown in the enlarged view of FIG. 4(b). The chamfered portion has an axial dimension La and a radial dimension Lr of 0.5~5 mm and a corner radius R of 1.0~10 mm. Thus, it has a smooth connection (transition) portion.

FIG. 5 is a cross-sectional explanatory view of a grinding method of the wheel hub 20. As shown in FIG. 5 (a), the counter portion A of the shaft shaped portion 8 may be ground, after heat treatment, by a formed grinding wheel 21 simultaneously with the base portion 7c of circular arc cross-section and the inner raceway surface 5a. As shown in FIG. 5(b), the corner portion A may be cut, e.g. by bite, and then only the base 7c and the inner raceway surface 5a may be simultaneously ground by a formed grinding wheel 22. In this case the surface roughness of the corner portion A is limited to 6.3 Ra or less. "Ra" is one of the roughness form parameters of JIS (JIS B 0601-1994) and means the arithmetical mean of roughness, i.e. a mean value of the absolute value deviation from the mean line. This makes it possible to prevent transcription or generation of scratch damages on the surfaces of tapered rollers 3 even though the tapered rollers 3 would be contacted with the corner portion A during assembly of the wheel hub 20. Thus, this prevents the generation of noise due to damage on the tapered rollers and extends the life of the wheel bearing apparatus.

FIG. 6 shows a method for assembling the wheel hub 20. In the wheel bearing apparatus of this embodiment, the larger flange 14, to guide the outer side tapered rollers 3, is formed on the outer member 2. An assembling method is adopted where the seal 12 and the tapered rollers 3, held in the cage 10, are previously assembled into the outer member 2. The wheel hub 20 is then inserted into the outer member 2 as shown by the arrow. During which, since at least tapered rollers 3 positioned radially upper positions are held in a suspended condition by its own weight, the wheel hub 20 can be assembled with the tapered rollers 3 being contacted with the corner portion A. According to this embodiment, since the corner portion A is formed as a smooth chamfered portion having a circular arc cross-section, the tapered rollers 3 will not be seriously damaged even though the surface of the corner portion A would be transcribed on the surface of the tapered rollers 3.

In the wheel bearing apparatus having such a structure, the wall of the wheel hub 20 at its outer side end has a substantially uniform thickness. The thickness t1, t2 of portions corresponding to the inner raceway surface 5a is set within a predetermined range. The corner portion A of the wheel hub 20 is formed as a smooth chamfered portion. Thus, it is possible to simultaneously achieve reduction of weight and size and increase rigidity of the wheel bearing apparatus. Also, this prevents the generation of damage on the tapered rollers during assembly of the bearing apparatus to extend its life.

FIG. 7 is a longitudinal section view of a third embodiment of the vehicle wheel bearing apparatus. FIG. 8(a) is a partially enlarged section view of a corner B of FIG. 7. and FIG. 8(b) is a partially enlarged section view of a corner C of FIG. 7. FIG. 9(a) is a partially enlarged section view of FIG. 7. FIG. 9(b) is a partially enlarged section view similar to FIG. 9(a) and showing a condition before caulking process. This embodiment is only partially different from the first embodiment (FIG. 1) in the structures of the wheel hub, outer member and inner ring same, the reference numerals as those used in the first embodiment are also used in this embodiment for designating the same components.

The wheel bearing apparatus of this embodiment is a third generation type used for a driven wheel. It has an inner member 23, an outer member 24, and double row tapered rollers 3, 4 freely rollably contained between the inner and outer members 23, 24. The inner member 23 includes a wheel hub 25 and the inner ring 26 press fit onto the wheel hub 25, via a predetermined interference.

The wheel hub 25 is integrally formed with one (outer side) tapered inner raceway surface 25a on its outer circumference. A cylindrical portion 5b extends from the inner raceway surface 25a defining an axially extending shaft shaped portion 8. A larger flange 25b is integrally formed on the larger diameter side of the inner raceway surface 25a of the wheel hub 25 to contact the larger diameter end surface of the tapered rollers 3 to guide the tapered rollers 3. In addition, any smaller flange for holding the tapered rollers 3 is not formed on the smaller diameter side of the inner raceway surface 25a. The shaft shaped portion 8 axially extends in a straight fashion from the smaller diameter side of the inner raceway surface 25a.

The outer member 24 is integrally formed, on its inner circumference, with outer and inner side tapered outer raceway surface 24a, 2b. The outer side raceway surface 24a is arranged opposite to the inner raceway surface 25a of the wheel hub 25. Inner side tapered outer raceway surface 2b is arranged opposite to an inner raceway surface 6a of the inner ring 26. The outer member 24 is made of medium carbon steel including carbon of 0.40~0.80% by weight such as S53C. The double row outer raceway surfaces 24a, 2b are hardened by high frequency induction quenching to have a surface hardness of 58~64 HRC.

Similar to the previous described embodiments, also in this embodiment, a pitch circle diameter PCDi of the inner side tapered rollers 4 is set smaller than a pitch circle diameter PCDo of the outer side tapered rollers 3. The diameter of the inner side tapered rollers 4 is set smaller than the diameter of the outer side tapered rollers 3. This reduces the weight and size of the wheel bearing apparatus and increases the fundamental rated load of each row of rolling elements to increase the rigidity of the row of rolling elements.

As shown in the enlarged view of FIG. 8(a), the corner portion B between the shaft shaped portion 8 and the chamfered portion 8b is smoothly rounded. In addition, as shown in FIG. 8(b), the corner portion C of the larger flange 25b is formed to have a predetermined chamfered configuration and dimension with a corner radius R. That is, the corner portion C is formed with an axial chamfer dimension La and a radial dimension Lr of 0.15~0.8 mm, and a corner radius R of 0.15~2.0 mm in order to have smooth transition portions.

These corner portions B, C may be previously cut, e.g., by a turning process or ground after heat treatment by a formed grinding wheel simultaneously with the base portion 7c and the inner raceway surface 25a. Thus, it is possible by the simultaneous grinding to further smoothly form the transition portions and to improve its surface roughness.

In the wheel bearing apparatus having such a structure, the outer side end of the wheel hub 25 has a substantially uniform wall thickness. The thickness t1, t2 of the inner raceway surface 25a is set within a predetermined range. The corner portions B, C of the wheel hub 25 are smoothly rounded. Thus, it is possible to provide a wheel bearing apparatus that can simultaneously solve the antinomic problems of reducing the weight and size of the wheel bearing apparatus and increasing its rigidity and strength. Also, it can prevent the generation of damage on the tapered rollers 3 during assembly of the bearing apparatus. Further, it improves the contacting condition between the larger flange 25b and the tapered rollers 3 to extend the life of the bearing apparatus.

Further in this embodiment, the inner ring 26 is formed on its outer circumference with tapered inner raceway surface 6a. A larger flange 6b on the inner raceway surface 6a is formed on its larger diameter side. The larger flange 6b guides the tapered rollers 4. On its smaller diameter side, a smaller flange 6c prevents the tapered rollers 4 coming out of the bearing. The inner ring 26 is press fit onto the cylindrical portion 5b of the wheel hub 25, via a predetermined interference. It is axially secured under a condition applying a predetermined bearing pre-pressure by the caulked portion 9. The caulked portion 9 is formed by plastically deforming the end of the cylindrical portion 5b. The inner ring 26 is made of high carbon chrome steel such as SUJ2. It is hardened to its core by dipping quenching to have a surface hardness of 58~64 HRC.

As shown in FIG. 9 (a), the larger diameter end of the inner raceway surface 6a of the inner ring 26 is formed at a position more than 5 mm axially away from the larger end face 6e. A smaller diameter portion 27 is formed at a position radially inward, via a predetermined step δ, from the outer circumference 6d of the larger flange 6b of the inner ring 26. A magnetic encoder 13 is fit onto the ring at their position. This reduces a hoop stress generated on the outer circumference 6d of the larger flange 6b even though the inner ring would be expanded radially outward during the caulking process. Also, this suppresses deformation of the larger flange 6b to keep a good contacting condition between the larger flange 6b and the tapered rollers 4.

FIG. 9(b) shows the end portion of the cylindrical portion 5b before caulking. It is formed as a hollow cylindrical portion 17. The inner circumferential surface 6g (shown by a two-dot chain line) of the inner ring 26 is formed as a tapered surface radially smaller toward the inner side. Thus the interference between the cylindrical portion 5b and the inner ring 26 is gradually increased toward the inner side. Thus, an inner ring fastening force, by the caulked portion 9 (shown by a two-dot chain line), is increased to suppress deformation of the cylindrical portion 5b. Accordingly, it is possible to increase the inner ring fastening force in addition to the provision of the step portion δ on the inner ring 26. This reduces the hoop stress and suppresses the generation of deformation (falling down) of the larger flange 6b. Although it is shown herein that the tapered surface is formed on the inner circumferential surface, it may be formed on the outer circumferential surface of the cylindrical portion.

FIG. 10 is a longitudinal section view of a fourth embodiment of the vehicle wheel bearing apparatus. This embodiment is only partially different from the third embodiment (FIG. 7) in the structures of the wheel hub, outer member and rolling elements. The same reference numerals as those used in the third embodiment are also used in this embodiment to designate the same components.

The wheel bearing apparatus of this embodiment is a third generation type used for a driven wheel. It includes an inner member 28, an outer member 29, and double row balls 30 and tapered rollers 4 freely rollably contained between the inner and outer members 28, 29. The inner member 28 includes a wheel hub 31 and inner ring 26 press fit onto the wheel hub 31, via a predetermined interference.

The wheel hub 31 is integrally formed with a wheel mounting flange 7 at one end. One (outer side) circular arc inner raceway surface 31a is formed on the outer circumference of the wheel hub. A cylindrical portion 5b extends from the inner raceway surface 31a defining an axially extending shaft shaped portion 8. The wheel hub 31 is made of medium carbon steel including carbon of 0.40~0.80% by weight such as S53C. It is hardened by high frequency induction quenching so that a region, from an inner side base portion 7c of the wheel mounting flange 7 to the cylindrical portion 5b via the inner raceway surface 31a and the shaft shaped portion 8, has a hardened layer 32 with a surface hardness of 58~64 HRC (shown by cross-hatch). Accordingly, the wheel hub 31 has a sufficient mechanical strength against rotary bending loads applied to the wheel mounting flange 7. The anti-fretting strength of the cylindrical portion 5b at a region press-fit with the inner ring 26 can also be improved. The balls 30 are made of high carbon chrome steel such as SUJ2. They are hardened to their core by dip quenching to have a surface hardness of 58~64 HRC.

The outer member 29 is integrally formed with a body mounting flange 2a on its outer circumference. Its inner circumference has an outer side circular arc outer raceway surface 29a opposite to the inner raceway surface 31a of the wheel hub 31 and an inner side tapered outer raceway surface 2b opposite to the inner raceway surface 6a of the inner ring 26. The outer member 29 is made of medium carbon steel including carbon of 0.40~0.80% by weight such as S53C. The double row outer raceway surfaces 29a, 2b are hardened by high frequency induction quenching to have a surface hardness of 58~64 HRC. A plurality of balls 30 and tapered rollers 4 are freely rollably contained, via cages 33, 11, between the raceway surfaces 29a, 31a and 2b, 6a.

In this embodiment, a pitch circle diameter PCDi of the inner side tapered rollers 4 is set smaller than a pitch circle diameter PCDo of the outer side balls 30. This enables an inner side outer diameter D of the outer member 29 to be set smaller. The use of the tapered rollers 4 as the inner side rolling elements enables a small knuckle size without reducing the fundamental rated load of the inner side row of rolling elements. This increases the rigidity of the inner side row of rolling elements while reducing the weight and size of the wheel bearing apparatus.

The base portion 7c of the wheel mounting flange 7 is formed as a surface with a circular arc cross-section of a predetermined radius of curvature. A minimum wall thickness t3 of the base portion 7c is set so that it has a wall thickness more than two times the effective depth of the hardened layer 32. As a result of a FEM analysis of the rigidity of the wheel hub 31, it is set so that a relationship between the thickness t3 of the base portion 7c and the diameter d3 at its corresponding position satisfies the range of $0.2 \leq t3/d3 \leq 0.3$. The thickness t3 has a thickness more than 2 times the effective depth of hardened layer 32.

In addition, a relationship between a wall thickness t4 in a contacting angle $\alpha$ of the ball 30 against the inner raceway surface 31a of the wheel hub 31 and a diameter (ball contacting diameter) d4 is set so that it is in a range of $0.2 \leq t4/d4 \leq 0.3$. It is more than 2 times the effective depth of hardened layer 32. It is found that desired rigidity cannot be obtained when the wall thickness t3, t4 of the base portion 7c and the inner raceway surface 31a is less than 20% of the diameter d3, d4 of the corresponding portions because of excessive deformation. On the other hand, expected increase of rigidity cannot be obtained even though the wall thickness exceeds 30%. Instead, the weight of the wheel hub is remarkably increased. The effective depth of the hardened layer is set within a range of 2~5 mm (about 3.5 mm). This prevents the generation of cracks by high frequency quenching. Also, it achieves reduction of weight of the wheel bearing apparatus while keeping the strength and rigidity of the wheel hub 31 corresponding to conditions of use.

The present disclosure has been described with reference to the preferred embodiments. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

The wheel bearing apparatus of the present disclosure can be applied to a wheel bearing apparatus of third generation type for a driven wheel.

What is claimed is:

1. A vehicle wheel bearing apparatus comprising:
    an outer member formed with a body mounting flange on its outer circumference, the body mounting flange to be mounted on a suspension apparatus of a vehicle, and on the outer member inner circumference has double row outer raceway surfaces;
    an inner member includes a wheel hub and an inner ring, the wheel hub having, at one end, an integrally formed wheel mounting flange, the wheel hub outer circumference has one inner raceway surface arranged opposite to one of the double row outer raceway surfaces, and a cylindrical portion axially extends from the inner raceway surface, via a shaft shaped portion, the inner ring is adapted to fit onto the cylindrical portion of the wheel hub, via a predetermined interference, and the inner ring outer circumference includes the other inner raceway surface arranged opposite to the other of the double row outer raceway surfaces;
    double row rolling elements freely rollably contained between the outer and inner raceway surfaces, respectively, of the outer member and the inner member;
    at least the inner side rolling elements of the double row rolling elements are tapered rollers and a pitch circle diameter of the inner side rolling elements is set smaller than that of the outer side rolling elements;
    a substantially conical recess is formed at an outer side end portion of the wheel hub and a depth of the recess extends near to the shaft shaped portion beyond the bottom of the inner raceway surface of the wheel hub; and
    thickness of a portion of the wheel hub where the inner raceway surface is formed is set within a predetermined range and the outer side wall of the wheel hub is formed with a substantially constant thickness along the inner surface of the recess.

2. The vehicle wheel bearing apparatus of claim 1, wherein a predetermined hardened layer is continuously formed, by high frequency induction quenching, in a region from the inner side base of the wheel mounting flange of the wheel hub to the cylindrical portion, and a thickness of a wall of the wheel hub where the inner raceway surface is formed is set larger than two times the effective depth of said hardened layer.

3. The vehicle wheel bearing apparatus of claim 1, wherein the outer side rolling elements are tapered rollers, a thickness of a wall of the wheel hub where the larger diameter side of the inner raceway surface is positioned is set larger than a thickness of a wall of the wheel hub where the middle portion of the inner raceway surface is positioned, and wherein the thickness and the diameter of the outer circumference of the wheel hub at the same position as that of the thickness is set as having a relationship of $0.2 \leq t1/d1 \leq 0.3$.

4. The vehicle wheel bearing apparatus of claim 3, wherein the thickness of a wall of the wheel hub where the middle portion of the inner raceway surface is positioned and a diameter d2 of the outer circumference of the wheel hub as the same position as that of the thickness is set to have a relationship $0.2 \leq t2/d2 \leq 0.3$.

5. The vehicle wheel bearing apparatus of claim 3, wherein any larger flange for guiding the tapered rollers is not formed on the larger diameter side of the inner raceway surface of the wheel hub, and wherein the larger flange is formed on the larger diameter side of the outer raceway surface of the outer member.

6. The vehicle wheel bearing apparatus of claim 3, wherein the diameter of each inner side rolling element is smaller than that of each outer side rolling element.

7. The vehicle wheel bearing apparatus of claim 1, wherein the outer side rolling elements are balls and the wall thickness of the inner raceway surface of the wheel hub is set to have a range of 0.2~0.3 times the outer circumference of the wheel hub at the same position.

8. The vehicle wheel bearing apparatus of claim 1, wherein the corner portion of the circumference of the wheel hub has a surface of a predetermined circular arc cross-section and its transition portions are smoothly formed.

9. The vehicle wheel bearing apparatus of claim 8, wherein the corner portion is ground by a formed grinding wheel simultaneously with the inner raceway surface after heat treatment.

10. The vehicle wheel bearing apparatus of claim 1, wherein the inner ring is axially secured on the wheel hub with an applied predetermined bearing pre-load by a caulked portion, formed by plastically deforming radially outward the end of the cylindrical portion of the wheel hub.

11. The vehicle wheel bearing apparatus of claim 10, wherein a predetermined hardened layer is continuously formed, by high frequency induction quenching, in a region from the inner side base of the wheel mounting flange to a portion near the caulking portion of the cylindrical portion via the inner raceway surface and the shaft shaped portion.

12. The vehicle wheel bearing apparatus of claim 10, wherein the inner side end position of the hardened layer is set within a region from a position corresponding to the larger diameter end of the inner raceway surface of the inner ring to a position near the caulking portion.

13. The vehicle wheel bearing apparatus of claim 10, wherein the end portion of the cylindrical portion before caulking is formed as a hollow cylindrical portion, the circumference of the hollow cylindrical portion is formed with an annular groove having a depth of 0.5~1.0 mm, the annular groove is positioned at inner side at a position corresponding to the larger diameter end of the inner raceway surface and it extends from a chamfered portion of the inner ring beyond its larger diameter end face, and the hardened layer extends to the annular groove.

14. The vehicle wheel bearing apparatus of claim 10, wherein the larger diameter end of the inner raceway surface of the inner ring is formed at a position more than 5 mm away from the larger end face of the inner ring.

15. The vehicle wheel bearing apparatus of claim 10, wherein the inner ring is formed on its outer circumference with a tapered inner raceway surface and on the larger diameter side of the inner raceway surface a larger flange for guiding the tapered rollers, and the inner ring is formed on its inner side with a smaller diameter portion, via a predetermined step.

16. The vehicle wheel bearing apparatus of claim 15, wherein the interference between the inner ring and the cylindrical portion gradually increases toward the inner side.

* * * * *